US 8,200,821 B2

(12) United States Patent
Mody et al.

(10) Patent No.: US 8,200,821 B2
(45) Date of Patent: Jun. 12, 2012

(54) SYSTEM AND METHOD FOR IMPROVED IN-BROWSER NOTIFICATION

(75) Inventors: Nirmal Mody, Lansdale, PA (US); Srini Avirneni, Chester Spring, PA (US); Brian Van Lieu, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 127 days.

(21) Appl. No.: 12/488,264

(22) Filed: Jun. 19, 2009

(65) Prior Publication Data

US 2010/0325217 A1 Dec. 23, 2010

(51) Int. Cl.
*G06F 15/173* (2006.01)
*G06F 15/16* (2006.01)

(52) U.S. Cl. .................. 709/225; 709/233

(58) Field of Classification Search .............. 709/225, 709/233
See application file for complete search history.

(56) References Cited

U.S. PATENT DOCUMENTS

| | | | |
|---|---|---|---|
| 7,233,781 B2 * | 6/2007 | Hunter et al. | 455/404.1 |
| 7,272,651 B1 * | 9/2007 | Bolding et al. | 709/227 |
| 7,707,271 B2 * | 4/2010 | Rudkin et al. | 709/218 |
| 2002/0040396 A1 * | 4/2002 | Yoshihara et al. | 709/225 |
| 2002/0071422 A1 | 6/2002 | Amicangioli | |
| 2003/0212999 A1 * | 11/2003 | Cai | 725/119 |
| 2005/0066053 A1 * | 3/2005 | McDysan | 709/243 |
| 2005/0177622 A1 * | 8/2005 | Spielman et al. | 709/206 |
| 2006/0262789 A1 | 11/2006 | Peleg et al. | |
| 2008/0244076 A1 | 10/2008 | Shah et al. | |
| 2009/0129340 A1 * | 5/2009 | Handa | 370/331 |
| 2009/0313114 A1 * | 12/2009 | Arampatzis | 705/14.45 |
| 2010/0153487 A1 * | 6/2010 | Greven et al. | 709/203 |

OTHER PUBLICATIONS

Extended EP Search Report for application No. EP 10165880, mailed Oct. 5, 2011.

* cited by examiner

*Primary Examiner* — Larry Donaghue
(74) *Attorney, Agent, or Firm* — Banner & Witcoff, Ltd.

(57) ABSTRACT

Systems and methods for sending/receiving improved in-browser notification messages are provided. The notification messages are overlaid on HTTP traffic on port 80 for IP addresses provisioned to receive the notification messages from various sources, including weather, emergency broadcast, and police stations. A load balancer within the end-to-end system allows HTTP traffic on port 80 to be forked from non HTTP traffic on port 80 to selectively insert notification messages. The notifications are inserted by an internet content adoption protocol (ICAP) server in communication with other devices within the system.

17 Claims, 5 Drawing Sheets

SYSTEM AND METHOD FOR IMPROVED IN-BROWSER NOTIFICATION

TECHNICAL FIELD

Aspects of the disclosure relate to providing notifications to subscribers via an internet browser. More specifically, aspects of the disclosure relate to methods and related systems for sending in-browser messages to subscribers in real-time.

BACKGROUND

It is necessary for an internet service provider (ISP) to inform its subscribers in real-time about important information pertaining to usage, policy changes, alerts, etc. ISPs currently utilize several methods, including e-mail, telephone, postal mail, and walled-garden and proprietary vendor in-browser notification products, to notify subscribers. However, these notification methods are not immediate and not always successful. For instance, subscribers do not regularly check their emails and, therefore, may overlook the urgency of a particular message. Also, postal mail should not be utilized for extremely time-sensitive messages that require immediate attention. In addition, subscribers may not appreciate unsolicited telephone calls from their ISP.

While a walled-garden approach to notifying subscribers may be effective for certain applications, the drawback to this method is that it blocks all network traffic and, therefore, the user is unable to browse the internet while receiving notifications. As such, the need arises for a real-time notification method that is guaranteed to be viewed and does not disrupt subscriber services.

Currently, there are certain methods for performing in-browser notifications, all of which have limitations. One method is to deploy a system that inspects all packets traversing through the ISP's network and inject extra packets into the stream to notify the user when needed. The technology underlying this method is commonly referred to as Deep Packet Inspection and may serve many other purposes but requires that the technology be deployed throughout the ISP's network in order to view all packets. This technique is not passive and requires connections to be reset. The system has to spoof the server response to an HTTP request packet in order to insert a notification. Therefore, the perception of authenticity from the subscriber's point-of-view may be reduced.

A second current method for performing in-browser notifications is to have a software application deployed on the subscribers' computer that automatically displays a notification when needed. However, this method is inefficient as it requires the user to install the ISP's software package on each PC for the notification to be read.

Therefore, there is a need in the art for alternative schemes for routing specific traffic to users that need to be notified with a message in real-time over the internet.

BRIEF SUMMARY

The following presents a simplified summary of the disclosure in order to provide a basic understanding of some aspects. It is not intended to identify key or critical elements or to delineate the scope of the disclosure. The following summary merely presents some concepts of the disclosure in a simplified form as a prelude to the more detailed description provided below.

In an illustrative aspect of the disclosure, a notification system and method provides for implementation of in-browser messaging for the communication of information between an ISP and a subscriber.

In another illustrative aspect of the disclosure, the in-browser notification method allows an ISP provider to provide weather updates, emergency broadcasts, and other messages to subscribers that need such notification.

Other embodiments may be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other illustrative embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
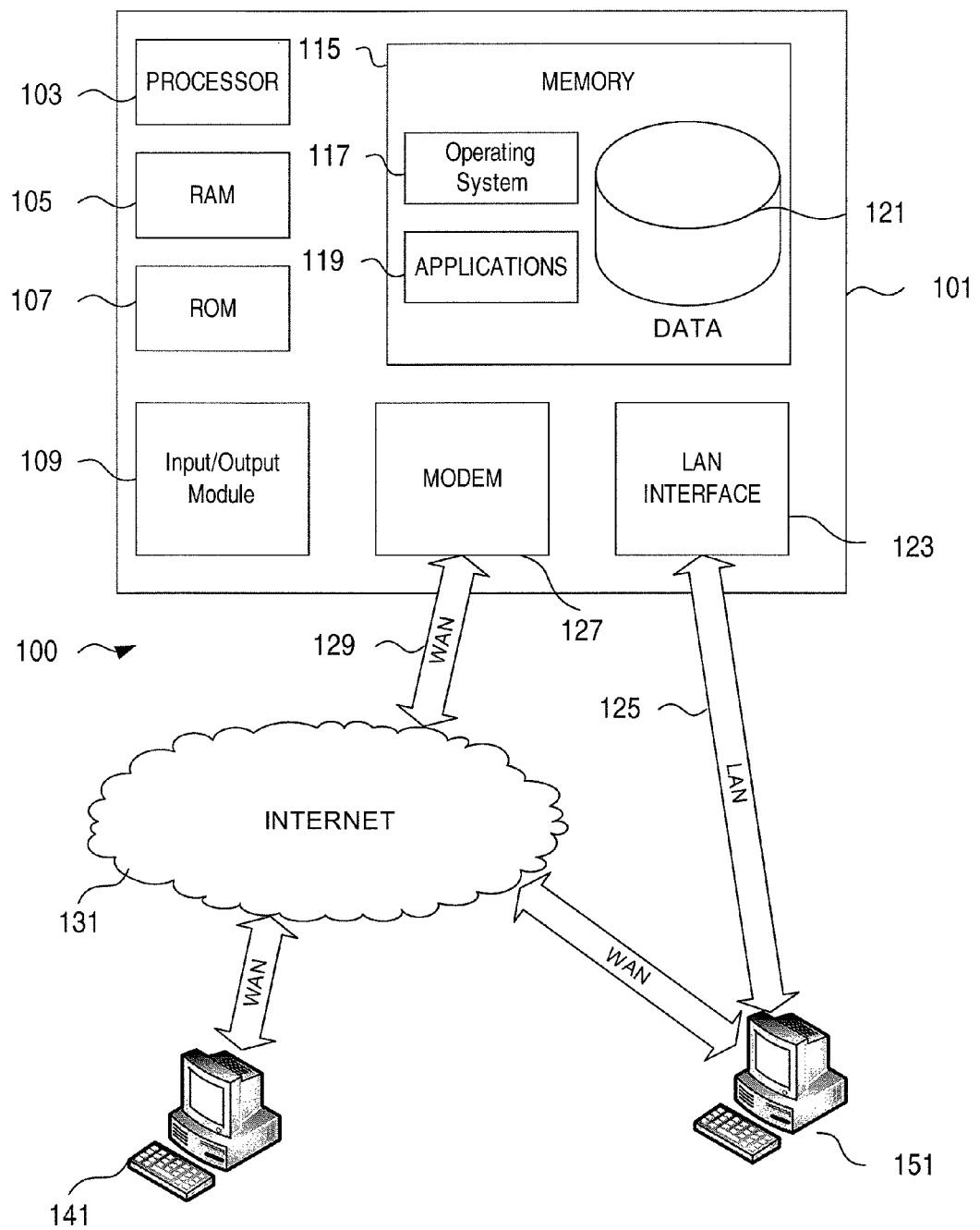
FIG. 1 illustrates a schematic diagram of a general-purpose digital computing environment in which certain aspects of the disclosure may be implemented.

FIG. 1 illustrates a block diagram of a generic computing device 101 (e.g., a computer server) in network 100 that may be used according to an illustrative embodiment of the disclosure. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
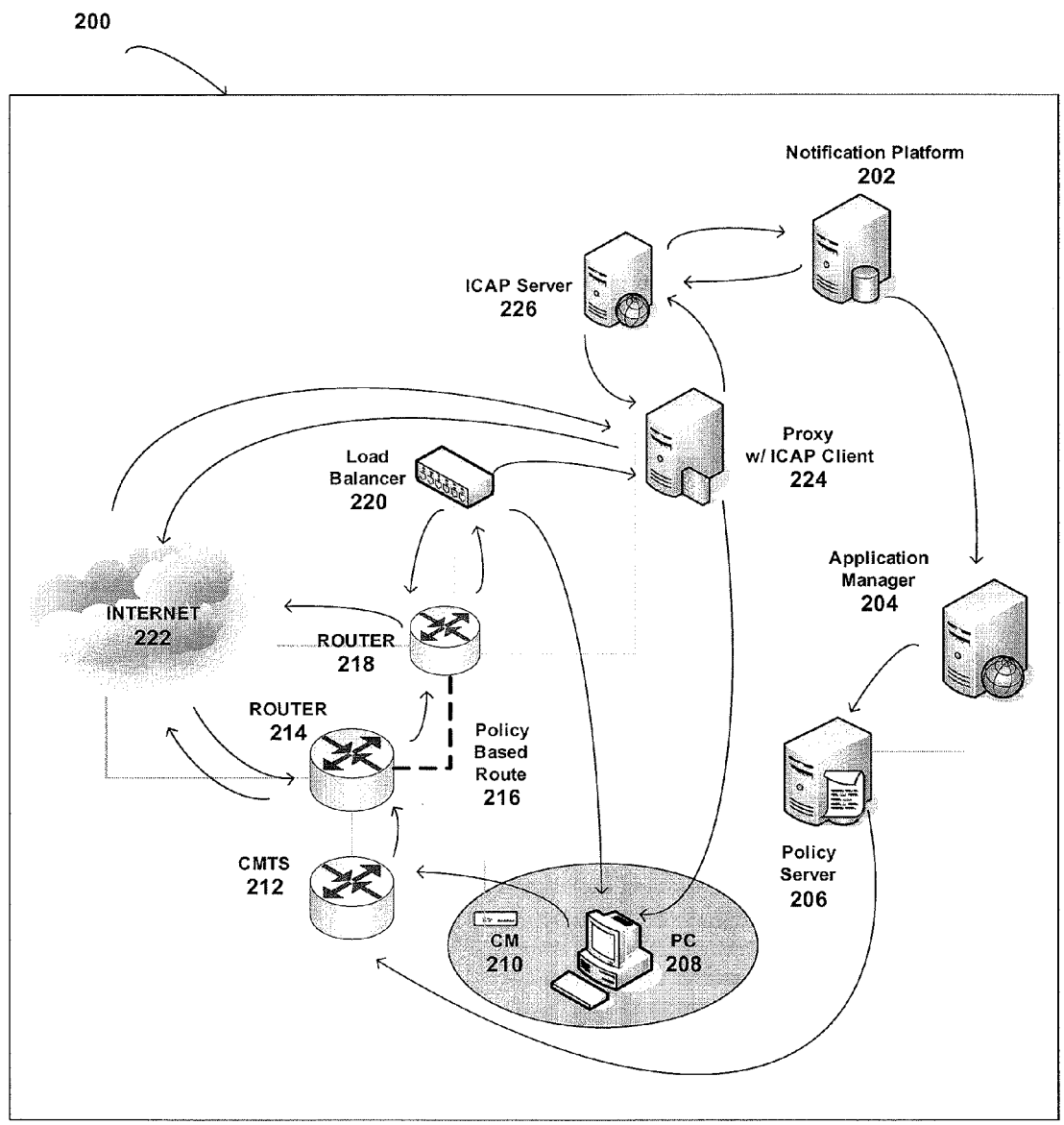
FIG. 2 illustrates an in-browser notification system in accordance with various aspects of the disclosure.

FIG. 2 illustrates a high level diagram of a system 200 that may be used to provide in-browser notifications in real-time in accordance with an illustrative embodiment of the disclosure.

As illustrated, system 200 depicts a notification platform (NP) 202, an application manager 204, a policy server 206, a PC 208, a cable modem 210, a cable modem termination system (CMTS) 212, routers 214 and 218, a load balancer 220, an internet server 222, a proxy server 224, and an internet content adoption protocol (ICAP) server 226. The components of system 200 may be connected by one or more communications links (as designated by the arrows in FIG. 2) to a single or multiple networks.

The NP 202 may receive and process a request from an external system to notify a subscriber of an in-browser notification in accordance with an aspect of the disclosure. The NP 202 may also identify subscriber details, determine which notification template to invoke, and may maintain state information on whether a subscriber has acknowledged an in-browser notification. In addition, the application manager 204 and policy server 206 may be utilized to establish a service flow, such as in accordance with the PacketCable Multi-Media specification, between the subscriber's cable modem 210 and CMTS 212. The CMTS 212 may maintain a service-flow to the cable modem 210 and add a Differentiated Services Code Point (DSCP) marking for TCP port 80 traffic. It should be noted that a DSCP marking may be set on a router directly for a given IP address and as such the application manager 204, policy server 206, cable modem 210 and CMTS 212 may be less pertinent.

Routers 214 and 218 may be utilized in system 200 to policy route traffic over a Generic Routing Encapsulated (GRE) tunnel 216. As packets traverse through the router 214, they may be forked based on a routing policy. DSCP-tagged packets may be sent over the GRE tunnel 216 while all other packets may be normally forwarded to internet server 222. Another router 218 may be used as a GRE-end point and a default routing policy may be set to forward all packets to the load balancer 220. The load balancer 220 may be responsible for forking HTTP traffic on port 80 to a proxy server 224 and all other port 80 traffic back to the Internet server 222. The load balancer 220 may also send a "HTTP 305 Use Proxy" response back to the PC 208 for any HTTP requests. The use proxy response may contain the location in URL format of the proxy server 224. The PC 208 may then directly contact the proxy server 224 to access web content.

The proxy server 224 may maintain state information on the session between the subscriber's internet browsing session and the internet. As packets traverse through the proxy 224, it may query the ICAP server 226 to determine whether the request may be fit for notification insertion. The ICAP server 226 may respond with a confirmation and once an HTTP 200 OK response is received, the proxy server 224 may forward the packets to the ICAP server 226 for notification insertion. The ICAP server 226 may contact the NP 202 to retrieve the notification(s) that needs to be inserted. The ICAP Server 226 may also cache the notification internally or externally for the purpose of improving response times.

Figure 3:
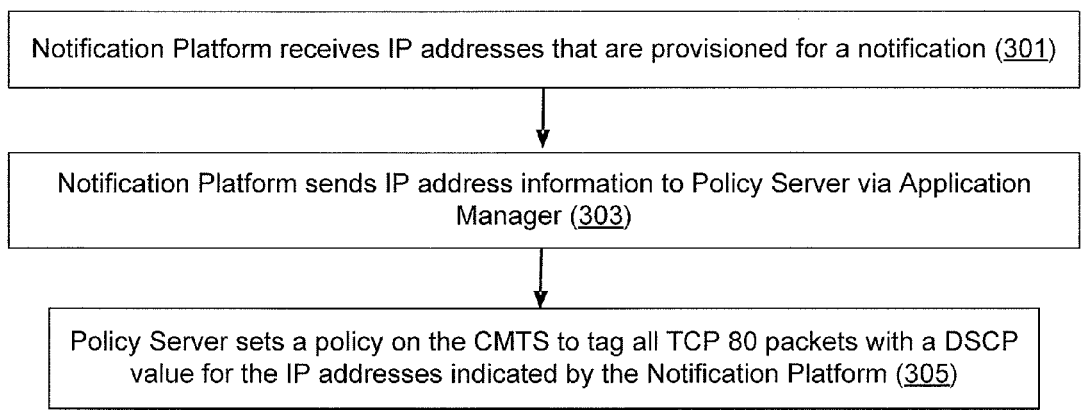
FIG. 3 illustrates a flow chart for setting a policy to tag HTTP packets with a DSCP value in accordance with various aspects of the disclosure.
Figure 4A:
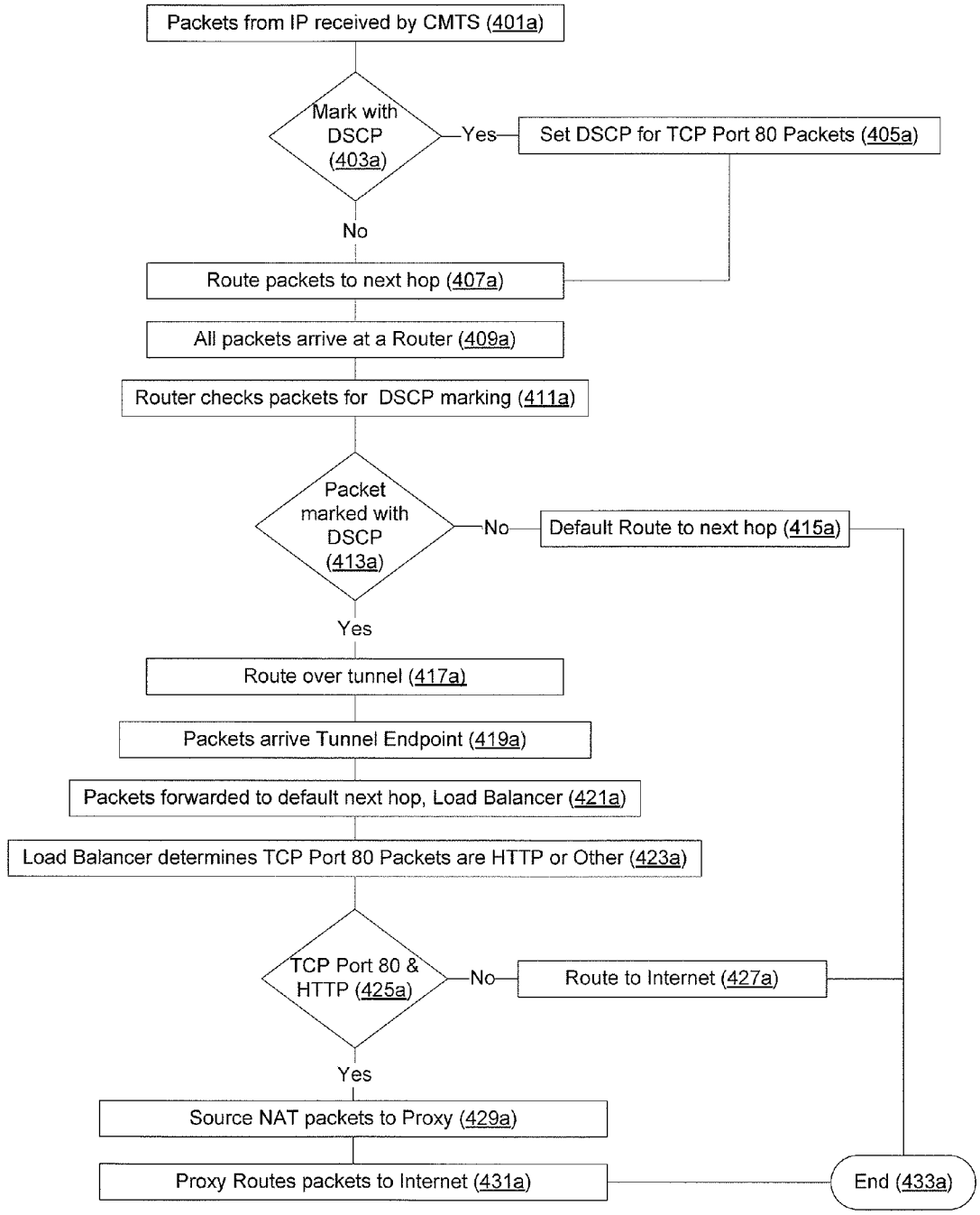
FIG. 4a illustrates a flow chart for marking appropriate data packets for an in-browser notification system in accordance with various aspects of the disclosure.
Figure 4B:
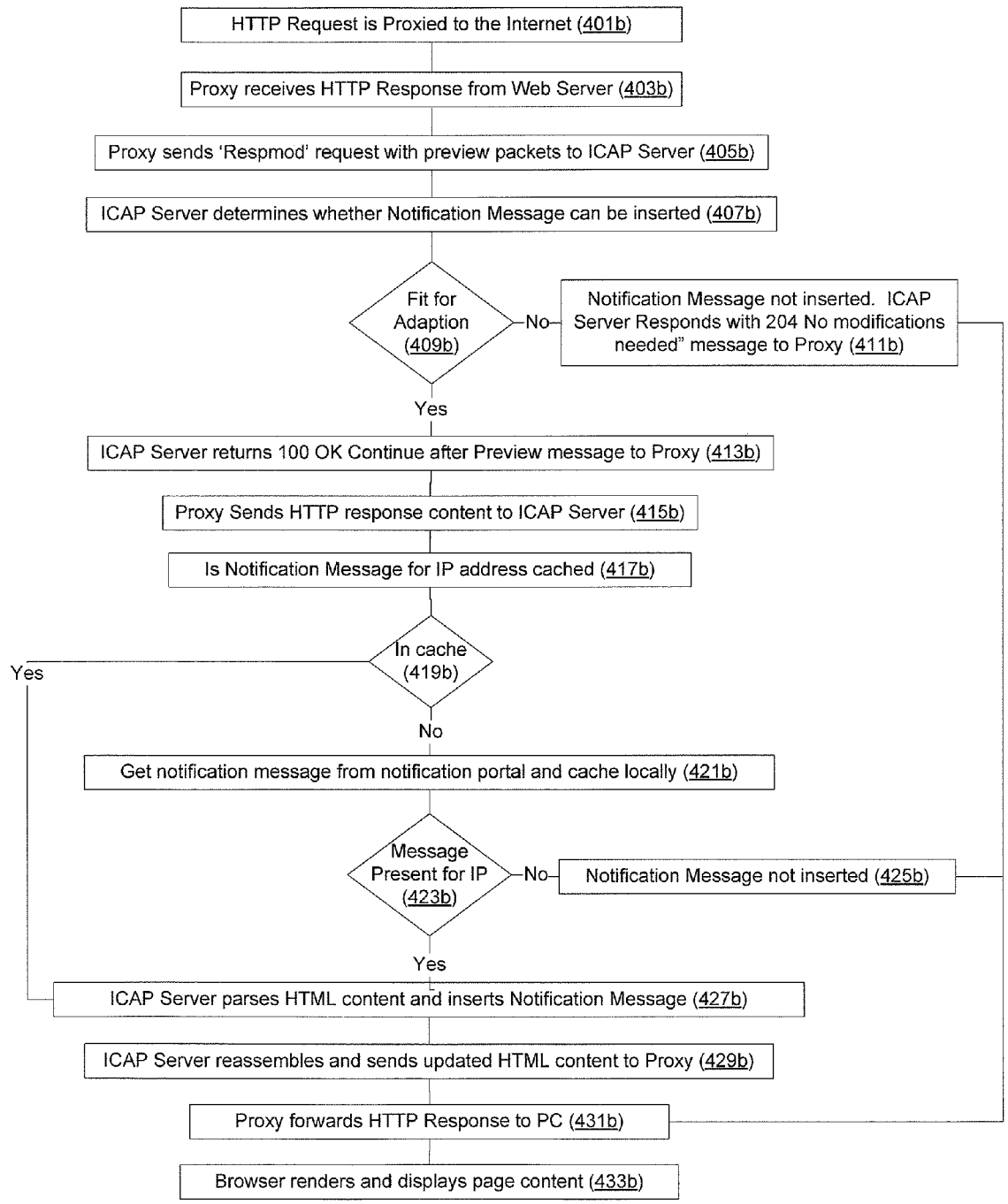
FIG. 4b illustrates a flow chart for inserting a notification into appropriate data packets for an in-browser notification system in accordance with various aspects of the disclosure.

The steps that follow in FIGS. 3, 4a, and 4b may be implemented by one or more of the components in FIGS. 1, 2, and/or other components, including other computing devices.

FIG. 3 illustrates a flow chart depicting a method for setting a policy on the CMTS to tag HTTP packets with a DSCP value in accordance with various aspects of the disclosure. The process begins at step 301 when NP 202 associated with an entity may receive IP addresses of subscribers that need to be notified. The entity may include any IP service provider having a plurality of users supported by these services. The NP 202 may receive this information from a variety of sources, including a business policy engine also associated with the entity and/or other sources directly from a third party. The ultimate source of third party information may be weather stations, police stations, hospitals, and/or an emergency broadcast station, among other places. The content of the notification may determine the ultimate source; for instance, weather stations may issue hurricane/tornado alerts for a particular community in a particular area and police stations may issue alerts for escaped criminals or amber alerts for missing children. In addition, the IP service provider may issue a notification to provide subscriber information about service outages, security threats, service alerts, and/or byte usage.

Then the process may move to step 303 where the NP may transmit the IP address information to an application manager 204 and/or policy server 206. The application manager 204 and policy server 206 may transmit information for setting a policy on the CMTS 212 to tag all TCP port 80 data packets coming from a subscriber's PC 208 and/or cable modem 210 with a DSCP value in step 305. This DSCP value may indicate that the IP addresses that have transmitted the corresponding data packets may need to be notified with a message. It should be noted that even though TCP port 80 data packets are tagged with a DSCP value in an exemplary embodiment, the tagging of packets on other ports outside of port 80 using other indicators outside of DSCP values is within the scope of the present disclosure. Even though application manager 204 and policy server 206 are shown as two different hardware components, in other embodiments, both of these components may be incorporated into a single piece of hardware. The same is true of the cable modem 210 and PC 208; although FIG. 2 shows the cable modem 210 and PC 208 as two different entities, both of these components may be integrated in a single device with integrated functionality.

FIG. 4a shows a flow chart depicting a method for marking appropriate data packets in an improved in-browser notification system in accordance with various aspects of the disclosure. The process in FIG. 4a may start at step 401a where data packets may be received by the CMTS 212 from a subscriber device such as cable modem 210 and/or PC 208. These data packets may include messages related to an HTTP GET request for accessing a particular webpage among other types of content. The process may then move to decision step 403a where the CMTS 212 may decide if the port 80 packets received from the subscriber should be marked with a DSCP value for receiving a notification message. If not, then the packets may be routed normally without being marked to default next hop as illustrated in 407a. If the port 80 packets do need to be marked with the appropriate DSCP value, the packets may be marked by the CMTS 212 in step 405a.

The process then moves to step 409a where packets may arrive at router 214. Then in step 411a, the router 214 may check whether data packets are marked with a specific DSCP value. If yes, as noted in 413a, then data packets are routed to a GRE endpoint through routers 214 and 218 using tunnel 216 as noted in 417a and 419a. If no, the data packets are routed to the default next hop in step 415a. In certain embodiments, multiple routers may not need to be used and only a single router routes the packets within system 200. Next, in step 421a, the data packets may be transmitted to a load balancer 220. After arriving at the load balancer 220, the process may then move to step 423a where a decision is made by the load balancer 220 as to whether the data packets may be categorized as either HTTP or non-HTTP traffic on TCP port 80 as illustrated in step 425a. If the packets are not both port 80 and HTTP, the packets may be routed to the internet server 222 in step 427a. This routing mechanism may occur by transmitting the data packets back to router 218 for transmitting to the internet server 222.

If the packets are both port 80 and HTTP traffic, the process then may move to step 429a where they may be sent to a proxy 224. The proxy server 224 may route the packets to the appropriate internet server 222 in step 431a. It should be noted that even though the load balancer 220 and proxy 224 are shown as two separate entities, a single component that combines the functionalities of both entities may also be used. It should also be noted that the load balancer 220 functionality may also be served by alternate means. For example, this functionality may occur via a server capable of identifying HTTP traffic and non-HTTP traffic on TCP port 80, capable of preserving existing TCP sessions and relaying HTTP traffic from the PC 208 to the proxy 224.

FIG. 4b shows a flow chart depicting a method for inserting a notification in an improved in-browser notification system in accordance with various aspects of the disclosure. After the packets reach the internet server 222 after being relayed by the proxy 224 as noted in 401b, response data packets responsive to incoming data packets may arrive at the proxy server 224 in step 403b. The process may then move to step 405b where the proxy 224 sends a request for content adaption with preview data packets from the response to the ICAP server 226. The preview contains partial content from the HTTP response. Then in steps 407b and 409b the ICAP server 226 may determine whether a notification message can be inserted based on the preview. If no, as noted in step 411b, the ICAP server 226 may respond with a message instructing that proxy 224 that no modifications are needed. The process may then jump to step 431b where the proxy 224 may forward response packets to the PC 208 and/or cable modem 210 without inserting a notification message.

If the ICAP server 226 determines that content is fit for adaption, as noted in step 413b, then the ICAP server 226 may return 100 OK message to the proxy 224. The 100 OK message instructs the proxy 224 that a notification message may be inserted in the response. In step 415b, the proxy 224 may send all the packets in the HTTP response to the ICAP server 226. Then in step 417b and step 419b, the ICAP server 226 may check whether any notification messages for the IP address are cached locally. If no, then the ICAP server 226 may attempt to fetch the notification message from the NP 202 as noted in step 421b and cache the notification locally for content adaption on subsequent requests from the PC 208. Then the process moves to step 423b where the system may check to see if a message is present for the subscriber IP. If no message is present for the subscriber IP, as noted in step 425b, then a notification message may not be inserted and the process may jump to step 431b where the proxy 224 may forward the response data packets to the PC 208. If a notification message is present for the IP address, then the ICAP server 226 may parse the HTTP content and insert the notification message in the response data packets as noted in step 427b. The message insertion is done in a manner that does not alter the original content of the response. After insertion is complete, the ICAP server 226 may reassemble the content before forwarding the response packets back to the proxy server 224 as noted in step 429b.

Finally, the data packets may be routed to back to the PC 208 and/or cable modem 210 in step 431b and the browser on the PC 208 may render the HTML content plus the notification, if inserted earlier, as an overlay in step 433b.

As an example consider, the case of a weather station (assume WCHI) trying to issue a tornado warning for the metro Chicago area.

Once the tornado is detected, WCHI may notify the Internet Service Provider (assume it is Comcast) of a tornado alert in the metro Chicago area. Upon receipt of this information, the ISP may initiate a notification message through one of its internal servers. This notification may state that Chicago residents should take necessary precautions against the impending tornado. The internal server may be any storage device capable of communication through a network with other devices in the IP network, including a business policy engine or a NP. Alternatively, a business policy engine and NP may both play a part in provisioning the proper IP addresses for receiving the notification of a tornado approaching.

Once the internal server has properly provisioned the appropriate IP addresses for a notification, the server may then communicate with an application manager. The application manager may set a policy on the CMTS associated with the IP service provider for marking traffic on TCP port 80 with a DSCP value of 8 in the header of the data packets from the IP addresses in question. Assume that a DSCP value of 8 indicates that the data packets associated with that IP address are port 80 traffic. It should be noted that HTTP traffic on other ports may also be marked in other embodiments of the disclosure.

Several minutes after the policy has been set, assume that a subscriber associated with one of the IP addresses in the metro Chicago area may decide to browse the Internet for the day's latest news from Example.com. Assume that the subscriber wishes to access http://www.example.com for news information. When she types in this address into her web browser, an HTTP GET request is sent from the subscriber's PC, which traverse through the CMTS. Note that in certain embodiments the data packets may be sent from the subscriber's PC to her cable modem, which may be responsible for forwarding the data packets to the CMTS. It should also be noted that at any time after the policy marking port 80 traffic has been set, web activity by the subscriber may trigger the notification process described here (i.e., subscriber does not have to wait several minutes after the policy has been set for this process to work).

Upon arrival of the data packets including the HTTP GET request, the CMTS may realize that the port 80 traffic from the subscribers' IP addresses needs to be marked with a DSCP value, for example 8, to indicate that this IP address should receive a notification about the tornado. As a result, the CMTS may mark the TCP port 80 traffic from the data packets associated with the subscriber and transmit the packet upstream to another router. A policy based route may be defined on the router that would then route all traffic with a DSCP 8 marking to an end point such as a router. The router then forwards all packets to a load balancer. It should be noted that data packets from other IP addresses requesting http://www.example.com may be transmitted straight to the internet server for Example.com via a router. In fact, data packets from other IP addresses not provisioned for receiving the tornado warning message and requesting any other internet server content may move straight to that server since these IP addresses may not need to receive a tornado warning.

Once the data packets associated with the IP address in question reach the load balancer, they may be forked into two different directions. The data packets that are HTTP traffic on TCP port 80 may be forwarded to a proxy server, which then forwards them to the Example.com server. All other non-HTTP traffic on TCP port 80 may be routed to the destination server using other routers in the system. Once the data packets reach the Example.com server, assume that the server has no objections to the subscriber accessing its website and hence decides to send a HTTP 200 OK response code along with the message body and any other response data packets. The response data packets may be forwarded back to the proxy server. The proxy server may then determine that the response data packets contain HTTP traffic on port 80 and are provisioned for an IP address that should receive a notification; hence the proxy server may contact the ICAP server about the notification message that should be inserted into the response data packets.

The ICAP server may parse the response data packets associated with the IP address in question, insert the notification as an overlay into these packets, reassemble them after insertion of the notification, and finally forward the response data packets back to the proxy server after reassembly. The notification message may read "Comcast has received a tornado warning from WCHI for the metro Chicago area from 5:30 pm to 5:57 pm. Please take all necessary precautions." In inserting the proper notification message, the ICAP server may or may not contact an internal server such as the NP to generate a message template. It should be noted that in inserting the notification into the response data packets, the ICAP server may not tamper with the response data itself; the notification message may be overlaid with minimal change to the response data content.

The proxy server may then forward the response data packets delivering the website http://www.example.com along with the notification stated above to the subscriber's web browser. The notification may be placed at any position on the webpage.

The notification may allow the subscriber to get rid of it by acknowledging that she has read it (i.e., clicking on a dialog box in a window containing the notification). In this way the notification may allow the subscriber to continue with reading the news on http://www.example.com and minimize the amount of disruption to her activity on the internet. The user may also choose to "snooze" the reminder whereby which the notification is disabled temporarily and the user is notified at a later time.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving IP address information including a plurality of IP addresses to set a policy to mark traffic with an indicator wherein the indicator indicates that an IP address needs to receive a notification, wherein the IP address information and notification originates at one of a weather station, police station, and emergency transmission service;
   receiving a first set of data packets from a user device;
   determining if the first set of data packets is transmitted from an IP address that matches one of the plurality of IP addresses included in the IP address information;
   if no match, transmitting the first set of data packets to an internet server via a router; and
   if matched:
      marking the first set of data packets with the indicator; and
      transmitting the first set of data packets via a router to a load balancer.

2. The method of claim 1 wherein the indicator is a Differentiated Services Code Point (DSCP) value.

3. The method of claim 1 wherein only port 80 traffic is marked with the indicator.

4. A method comprising:
   receiving a first set of data packets marked with an indicator that indicates that an IP address associated with a source of the data packets should receive a notification;
   if the first set of data packets is HTTP traffic, transmitting the first set of data packets straight to an internet server;
   if the first set of data packets is not HTTP traffic, transmitting the first set of data packets to the internet server via an alternate route;
   receiving a second set of data packets responsive to the first set of data packets from the internet server;

contacting an Internet Content Adoption Protocol (ICAP) server for insertion of the notification into the second set of data packets when the second set of data packets is HTTP traffic destined for an IP address provisioned for receiving the notification, wherein the Internet Content Adoption Protocol (ICAP) server parses the second set of data packets;

transmitting the second set of data packets to a user device wherein a browser on the user device displays the second set of data packets with the notification on a webpage.

5. The method of claim 4 further comprising removing all of the markings in the first set of data packets after receiving them.

6. The method of claim 4 wherein the first set of data packets is received from a cable modem termination system (CMTS) via a router.

7. The method of claim 4 wherein the indicator is a Differentiated Services Code Point (DSCP) value.

8. The method of claim 4 wherein only port 80 traffic is marked.

9. The method of claim 4 further comprising preserving other existing TCP sessions while routing the first and second set of data packets.

10. The method of claim 4 further comprising transmitting an HTTP 305 Use Proxy response to the user device.

11. The method of claim 4 wherein the contacting the Internet Content Adoption Protocol (ICAP) server for insertion of the notification occurs only if an HTTP 200 OK status line is included in the second set of data packets.

12. The method of claim 4 wherein the Internet Content Adoption Protocol (ICAP) server further requests a template for the notification corresponding to the IP address from a notification platform (NP).

13. The method of claim 12 wherein the notification platform (NP) responds with the template corresponding to the IP address.

14. The method of claim 13 wherein the Internet Content Adoption Protocol (ICAP) server further inserts the notification into the second set of data packets.

15. The method of claim 14 wherein the Internet Content Adoption Protocol (ICAP) server further reassembles the second set of data packets.

16. The method of claim 4 wherein the first set of data packets originates from the user device.

17. An apparatus comprising:
a processor; and
a memory configured to store computer readable instructions that, when executed by the processor, cause the processor to perform a method comprising:
receiving a first set of data packets marked with an indicator that indicates that an IP address associated with a source of the data packets should receive a notification;
if the first set of data packets is HTTP traffic, transmitting the first set of data packets straight to an internet server;
if the first set of data packets is not HTTP traffic, transmitting the first set of data packets to the internet server via an alternate route;
receiving a second set of data packets responsive to the first set of data packets from the internet server;
contacting an Internet Content Adoption Protocol (ICAP) server for insertion of the notification into the second set of data packets when the second set of data packets is HTTP traffic destined for an IP address provisioned for receiving the notification, wherein the Internet Content Adoption Protocol (ICAP) server parses the second set of data packets; and
transmitting the second set of data packets to a user device wherein a browser on the user device displays the second set of data packets with the notification on a webpage.

* * * * *